United States Patent [19]

Taylor et al.

[11] Patent Number: 4,566,486
[45] Date of Patent: Jan. 28, 1986

[54] SOFT SEAT FOR SAFETY VALVE

[76] Inventors: Julian S. Taylor; Wesley L. Taylor, both of 8300 SW. 8th, Oklahoma City, Okla. 73128

[21] Appl. No.: 585,970

[22] Filed: Mar. 5, 1984

Related U.S. Application Data

[63] Continuation-in-part of Ser. No. 355,981, Mar. 8, 1982, Pat. No. 4,446,886.

[51] Int. Cl.$^4$ .............................................. F16K 17/20
[52] U.S. Cl. ................................ 137/469; 137/516.29; 251/362
[58] Field of Search ........................... 137/516.29, 469; 251/362

[56] References Cited

U.S. PATENT DOCUMENTS

| | | | |
|---|---|---|---|
| 2,588,157 | 3/1952 | Olson | 137/516.29 |
| 2,676,782 | 4/1954 | Bostock | 137/469 X |
| 2,875,978 | 3/1959 | Kmiecik | 137/469 X |
| 3,044,743 | 7/1962 | Siegel | 137/516.29 X |
| 3,189,040 | 6/1965 | Johnson | 137/469 |
| 3,232,314 | 2/1966 | Koester | 137/516.29 |
| 3,255,774 | 6/1966 | Gallagher | 137/516.29 |
| 3,548,869 | 12/1970 | Weise | 137/516.29 |
| 3,741,523 | 6/1973 | Scaromucci | 251/362 X |
| 4,446,886 | 5/1984 | Taylor | 137/516.29 |
| 4,474,208 | 10/1984 | Looney | 137/516.29 |

FOREIGN PATENT DOCUMENTS 1019159  2/1966  United Kingdom ........... 137/516.29

Primary Examiner—Harold W. Weakley
Attorney, Agent, or Firm—Robert K. Rhea

[57] ABSTRACT

In a poppet-type relief valve, including a housing having a spring guide assembly axially biasing a valve toward a seat in its inlet passageway, a soft valve seat member is coaxially disposed in the inlet passageway. The soft seat member includes a rigid surface limiting movement of the spring urged valve toward the inlet passageway and further includes a resilient ring seal positioned adjacent the rigid surface in a manner to be cushion contacted by and form a bubble tight seal with the spring urged valve before the valve contacts the rigid surface.

7 Claims, 3 Drawing Figures

SOFT SEAT FOR SAFETY VALVE

The present invention is a continuation-in-part of an application filed by us in the United States Patent and Trademark Office on Mar. 8, 1982 under Ser. No. 355,981 for Safety Relief Valve Soft Seat, now U.S. Pat. No. 4,446,886.

BACKGROUND OF THE INVENTION

1. Field of the Invention

The present invention relates to pressure relief valves of the poppet or lift valve type and more particularly to an improved valve seat.

2. Description of the Prior Art

Pressure relief valves of the poppet or lift type generally comprise an elongated valve housing having an outlet port disposed at right angle to its inlet end. The inlet end is provided with a valve normally maintained seated on a seat intersecting the inlet passageway by a spring axially biasing the valve toward its seat in which excess pressure, above a predetermined limit, unseats the valve by compressing the spring.

One commonly used commercial design employs a precision ball valve disposed in a huddling chamber and seating on a finely ground metal seat. This type of relief valve enjoys the economy of manufacture of a precision ball valve member mated with a spherical lapped seat. While economical in manufacture these valves suffer from a relatively short service life due to a rapid deterioration of both the ball valve and the lapped seating surface as a result of mechanical impact while reseating.

This invention provides a greatly improved seating means through unique construction which provides all the economies of a spherical-shaped valve member with the bubble tight qualities of a resilient precision seat. Service life expectancies are on an order of magnitude greater than that of conventional metal ball valves and seats. The uniqueness of the design in part lies in the molding of an elastomer to a metal surface which then maintains the cylindrical precision of a seating lip. Further, the geometry of the seat lip is such that fluid pressure tends to move the resilient lip into bubble tight closure with the spherical valve member. Moreover the metal huddling chamber with limiting surface may be constructed of a material substantially softer than the ball valve member without adversely affecting service life thus permitting further economies in construction.

This invention is distinctive over the above referred to co-pending application by eliminating the sleeve member to which the resilient seal is bonded and bonds the resilient seal to the valve seat body with the latter being roll sealed in place thus further simplifying the valve and reducing its initial cost.

SUMMARY OF THE INVENTION

An elongated generally cylindrical valve housing, having a lateral exhaust port perpendicular to its axial inlet passageway, is provided with a spring urged plunger adjustably disposed axially in its other end portion bearing against a ball valve normally urged toward the housing inlet passageway. An improved seat member is disposed within the housing inlet passageway. The improved seat member is tubular in general configuration forming a huddling chamber at one end portion for the ball valve and defining a beveled annular inwardly converging ball valve stop surface intermediate its ends facing toward the ball valve for limiting movement of the ball valve toward the inlet pasageway. The other end portion of the seat member has a resilient ring seal bonded thereto. The ring seal has an annular surface projecting downstream adjacent the inwardly converging limit of the ball valve metallic stop seat formed by the annular converging surface. The downstream inner edge surface of the resilient ring seal forms a bubble tight seal with the ball valve when the latter is biased toward the inlet passageway in addition to cushioning movement of the ball valve toward its metallic seat.

The principal object of this invention is to provide an improved hard and soft seat assembly secured as a unit in the housing of a pressure relief poppet valve which includes an annular resilient seal disposed and held in place adjacent a ball valve stop surface forming a ring-like bubble tight concentric seal with the ball valve which cushions the shock of the ball valve with its metallic seat surface and materially increases the service life of the relief valve.

DESCRIPTION OF THE PREFERRED EMBODIMENT

Figure 1:
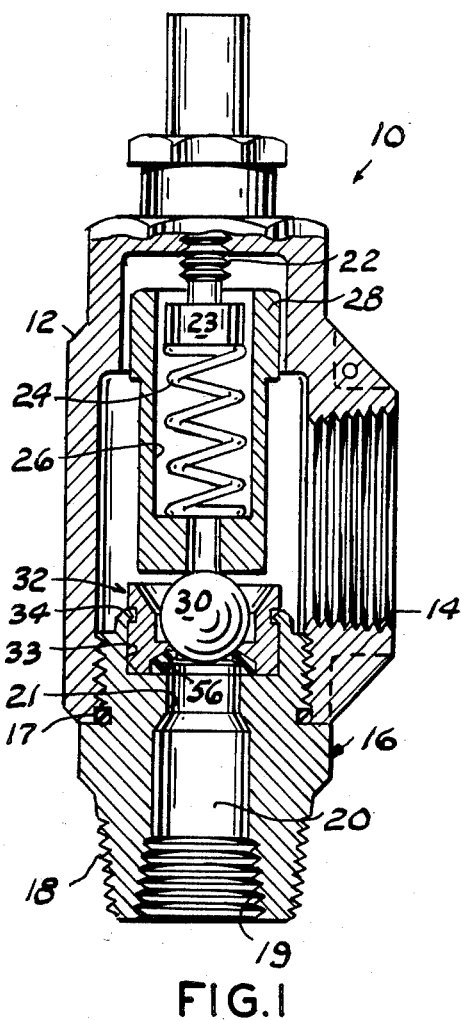
FIG. 1 is a vertical cross sectional view, partially in elevation, of a pressure relief valve having the improved soft seat assembly installed therein.
Figure 3:
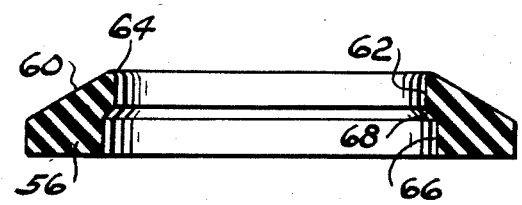
Figure 2:
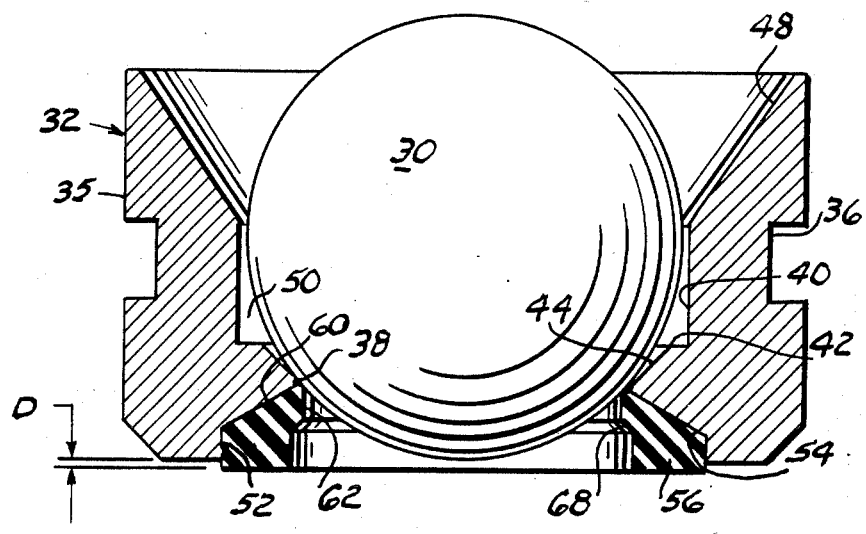
FIG. 2 is a vertical cross sectional view, to a larger scale, of the relief valve soft seat assembly and its associated ball valve; and, FIG. 3 is a diametric cross sectional view of the resilient seal, per se.

Like characters of reference designate like parts in those figures of the drawings in which they occur.

In the drawings:

The reference numeral 10 indicates a relief valve comprising a hollow elongated generally cylindrical valve housing 12 having an internally threaded lateral exhaust port 14. The inlet end of the valve housing threadedly receives inlet means 16 sealed by an O-ring 17 and having external threads 18 and internal threads 19 for connection with a line or fitting, not shown, containing fluid under pressure and forming a fluid inlet passageway 20. The other end portion of the valve housing 12 threadedly receives axially an adjusting screw 22 for adjusting the release pressure rating of the valve. The inward end of the adjusting screw bears against a spring keeper 23 mounted on one end of a helical spring 24 nested by a socket 26 formed in a spring guide 28 normally biasing a ball valve 30 to an inlet passageway closed position by the resilience of the spring.

Soft seat means 32, is nested by a socket 33 in the inward end portion of the inlet means 16, and forms a seat for the ball valve 30 for normally closing the inlet passageway 20. The inward end of the inlet means 16 terminates in a relatively thin annular wall 34 for the purposes presently explained. The soft seat means 32 comprises a generally cylindrical seat support member 35 having one end portion surrounded by the socket 33. Intermediate at its ends the periphery of the seat member 35 is provided with an annular groove 36. The inward end portion of the annular wall 34 is rolled into the groove 36 to anchor the seat member 35. The seat member 35 is centrally bored, as at 38, on a selected diameter smaller than the diameter of the ball valve 30, and is counterbored from its head end, as at 40, for receiving the ball valve 30 and forming an annular shoulder 42 perpendicular to the passageway axis. A portion of the annular shoulder 42 is cut away to form an inclined annular surface 44 converging upstream toward the axis of the inlet passageway 20 and facing toward the ball valve to form a stop and seat limiting movement of the ball valve 30 toward the housing inlet end. The wall at the downstream end of the seat member 35 is further bored to form an inclined surface 48 converging toward the inlet passageway and intersecting the counterbore 40 at substantially the horizontal diametric position of the ball valve 30 when seated in the seat member, as presently explained, thus defining a huddling chamber 50 for the ball valve. The other end portion of the seat member 35 is counterbored, as at 52, on a selected diameter which terminates in an inclined downstream converging surface 54 terminating adjacent but spaced upstream from the central bore 38.

The counterbore 52 and the converging surface 54 cooperatively receive a resilient seal ring 56 which is concentrically secured thereto by bonding, not shown. The seal ring 56 is preferably formed from rubber-like plastic material presently marketed under the trade names Viton or Vespel. The seal ring has an end surface 60 contiguously contacting the seat member surface 54 with the periphery of the seal ring closely nested by the counterbore 52. The innermost wall surface 62 of the resilient ring is substantially parallel with the longitudinal axis of the seat support 35 and defines a diameter of slightly smaller dimension that the bore 38 and this surface 62 intersects the resilient ring seal surface 60 on a relatively small radii 64 facing downstream toward the ball valve adjacent the upstream limit of the ball valve stop/seat surface 44. The seal 56 has a counterbore diameter 66 diametrically equal with the inlet means bore 21. The axial length of the wall surface defining the diameter 66 is substantially equal to one half the length of the seal and intersects a downstream inclined surface 68 substantially parallel with the seal end surface 60. The axial length of the resilient seal 56 is such that its upstream end portion projects beyond the upstream limit of the seat member 35 a selected distance D for the purpose of slightly compressing the resilient seal 56 sufficiently to form a fluid tight seal between the seat member 35 and inlet means 16 but without distorting the seal 56. The distance D is preferably relatively small, on the order of 0.010 inches (0.0254 mm). The inside diameter of the seal, defined by the wall 62, relative to the seat member bore 38 is such that the resilient seal surface 64 is initially contacted by the ball valve 30 in a bubble tight seal before the ball valve contacts the surface 44. Fluid pressure in the inlet passageway 20, opposed by the spring force against the ball valve 30, acts on the inner peripheral inclined edge surface 68 of the resilient seal to enhance the seal ring surface 64 sealing in a line point contact with the ball valve. This results in the ball valve popping or unseating at 1% to 2% of the pressure setting of the valve 10.

When the fluid pressure initially lifts the ball valve out of bubble tight contact with the seal ring surface 64 the escaping fluid is momentarily confined by the huddling chamber 50 so that it is effective on the entire upstream hemispherical portion of the ball valve 30. Stated another way, fluid pressure against the part-spherical portion of the ball valve exposed to the fluid pressure within the inner periphery 62 of the seal ring initially lifts the valve at a predetermined pressure setting wherein the escaping fluid, restricted by the huddling chamber wall 40, is applied to a greater surface area of the ball valve.

Additionally, the inclined annular surface 44 may be lapped at its line point contact with the ball valve 30 for seating therewith thus in effect forming a second or supplemental valve "hard seat" for high temperature installations.

It seems obvious the valve 30 could be a configuration other than spherical if provided with a hemispherical or at least a part-spherical portion, not shown, facing the resilient seal 56.

Obviously the invention is susceptible to changes or alterations without defeating its practicability. Therefore, we do not wish to be confined to the preferred embodiment shown in the drawings and described herein.

We claim:

1. In a relief valve of the poppet-type including a housing having an inlet passageway communicating with an outlet port and having resilient means biasing a valve toward the inlet passageway, the improvement comprising:
   a cylindrical seat support having an axial bore therethrough axially disposed in the housing inlet passageway and having a valve huddling chamber in its downstream end portion and a rigid valve seat intermediate its ends facing the valve, the upstream end portion of the seat support having a concentric counterbore defining a cylindrical wall surface on a diameter at least greater than the diameter of the valve housing inlet passageway and terminating in an inwardly and downstream directed frusto-conical surface intersecting the wall forming the axial bore in close spaced relation with respect to the rigid valve seat;
   a resilient seal ring having an outer cylindrical surface and a downstream inwardly directed frusto-conical surface contiguously bonded to the seat support respective upstream counterbored cylindrical and inwardly and downstream directed frusto-conical surfaces, said seal having a first upstream cylindrical inner wall surface diametrically substantially equal with the diameter of the housing inlet passageway and having a second cylindrical inner wall surface spaced downstream from said seal first cylindrical inner wall surface and concentric with and of smaller diameter than the seat support axial bore intersecting downstream the seal outer downstream and inwardly directed frusto-conical surface for forming an annular soft valve seat concentric with said rigid valve seat for sealing with said valve before said valve contacts the rigid valve seat,
   the space between said seal first and second cylindrical inner wall surfaces being spanned by an intermediate inwardly and downstream directed frusto-conical surface; and,
   means securing said seat support within the valve housing.

2. The combination according to claim 1 in which said valve is a ball valve.

3. The combination according to claim 1 in which said resilient seal ring is characterized by an annular tranversely arcuate edge surface facing downstream to form a contiguous concentric line contact with said valve when said valve is seated on said rigid seat.

4. The combination according to claim 3 in which an end portion of said seal ring abuts a portion of said housing around the inlet passageway upstream from said rigid valve seat for preventing distortion of said seal ring in response to fluid pressure.

5. The combination according to claim 4 in which the innermost inner peripheral portion of said seal ring projects inwardly of the cylindrical surface generated by the wall forming the housing inlet passageway, whereby fluid pressure against the seal intermediate inwardly and downstream directed frusto-conical surface biases the inner peripheral downstream end portion of said seal ring toward said valve when the latter is seated.

6. A relief valve, comprising:

a valve housing having an inlet passageway and an exhaust port;

a valve within said housing, said valve having at least a part-spherical surface coaxially facing and being moveable longitudinally of the housing toward and away from the inlet passageway;

a cylindrical seat support having an axial bore therethrough axially disposed in the housing inlet passageway, the downstream end portion of the support having diametrically decreasing counterbores defining a huddling chamber for said valve and terminating in an inwardly and upstream directed frusto-conical surface intersecting the axial bore and forming a rigid valve seat, the upstream end portion of the seat support having a concentric counterbore defining a cylindrical wall surface on a diameter at least greater than the diameter of the valve housing inlet passageway and terminating in an inwardly and downstream directed frusto-conical surface intersecting the wall forming the axial bore in close spaced relation with respect to the axial bore intersection of the rigid valve seat forming counterbore;

resilient means for biasing said valve toward the rigid valve seat and normally maintaining the major portion of said valve within the huddling chamber;

an annular resilient seal having an outer cylindrical surface and a downstream directed frusto-conical surface bonded to the seat support respective upstream counterbored cylindrical and inwardly and downstream directed frusto-conical surfaces, said seal having a first upstream cylindrical inner wall surface diametrically substantially equal with the housing inlet passageway and having a second cylindrical inner wall surface spaced downstream from said seal first inner wall surface and concentric with and of smaller diameter than the seat support axial bore and intersecting downstream, the seal outer downstream and inwardly directed frusto-conical surface and forming a soft valve seat concentric with the rigid valve seat, the space between said seal first and second cylindrical inner wall surfaces being spanned by an intermediate inwardly and downstream directed frusto-conical surface, whereby upstream fluid pressure against the seal inner inwardly and downstream directed frustoconical surface biases the soft valve seat of said seal into contiguous line contact sealing with said valve prior to the upstream limit of the valve movement; and, means securing said seat support within the valve housing.

7. The relief valve according to claim 6 in which the resilient seal is characterized by a transversely arcuate annular edge surface facing toward and normally contacting said valve.

* * * * *